Patented Feb. 17, 1942

2,273,774

UNITED STATES PATENT OFFICE 2,273,774

MANUFACTURE OF MONOPERPHTHALIC ACID

Joseph S. Reichert and Arthur A. Elston, Niagara Falls, N. Y., assignors to E. I. du Pont de Nemours & Company, Wilmington, Del., a corporation of Delaware No Drawing. Application October 8, 1940, Serial No. 360,341

7 Claims. (Cl. 260—502)

This invention relates to the preparation of organic monoperacids and their salts. More particularly, it relates to the preparation of monoperphthalic acid by reaction of phthalic anhydride and an inorganic peroxide such as hydrogen peroxide.

Monoperphthalic acid is an organic monoperacid having the following formula:

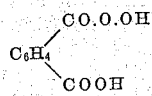

Methods heretofore available for the preparation of this peracid, its salts and solutions, have required extensive chemical control and manipulation. For this reason they have not appeared attractive for industrial application. Our new and improved method for manufacturing monoperphthalic acid and its salts, for preparing the acid or its salts in solution, and for isolating the solid peracid from solutions thereof, avoids a number of disadvantages inherent in manufacturing procedures now available in the chemical industry.

A method of preparing monoperphthalic acid from phthalic anhydride and alkaline solutions of peroxides has already been described in the chemical literature. This method involves shaking finely pulverized phthalic anhydride with an ice-cold solution of hydrogen peroxide of relatively low $H_2O_2$ concentration. This solution is one which has been rendered highly alkaline by the addition of 20% sodium hydroxide solution thereto. In solutions of such high dilution the major portion of phthalic anhydride dissolves and the resulting solution is then treated with an ice-cold solution of dilute sulfuric acid. After filtration through glass wool to remove undissolved phthalic anhydride and insoluble by-products it is possible to obtain the solid peracid by means of a complicated isolation procedure wherein the peracid is obtained first as a syrup which later solidifies into a crystalline mass.

This complicated and highly cumbersome procedure, utilizing peroxide solutions of considerable dilution, has never been sufficiently attractive to justify its operation on the commercial scale. Moreover, due to the relative insolubility of phthalic anhydride, this procedure has been available only to produce monoperphthalic acid in low concentrations. As contrasted with this involved and elaborate procedure, our process for the preparation of monoperphthalic acid is simple and direct, requiring but a relatively brief reaction period and no special equipment of any sort. Moreover, the monoperphthalic acid is secured either in solid form or in solutions of relatively high concentration without the necessity for subjecting the reaction mixture to extensive cooling during the reaction period.

Among the distinct advantages characteristic of our new and improved method for preparing solutions of monoperphthalic acid and its salts, an outstanding advantage is the fact that our method permits the preparation of solutions having active oxygen concentrations up to 50 volumes. Moreover, the process permits the preparation of solutions of monoperphthalic acid, acid in reaction, which solutions are relatively stable. The simplicity of the process, as well as the possibility of readily dissolving and reacting sufficient quantities of the reagent to produce substantial amounts of the peracid or its salts, renders possible isolation of the solid peracid by an equally simple and direct procedure.

The methods for the preparation of monoperacids from acid anhydrides and hydrogen peroxide previously available in the chemical industry have generally required either very dilute solutions of hydrogen peroxide or very highly concentrated solutions (solutions approximating almost chemically pure hydrogen peroxide). Moreover, they have universally required strong and continued cooling during the preparation. Such methods, while sufficiently satisfactory for some peracids, have not proved suitable for the industrial preparation of monoperphthalic acid from phthalic anhydride because of the very slight solubility of the anhydride in the peroxide solution. While methods employing highly concentrated solutions of hydrogen peroxide (96% $H_2O_2$) have occasionally been used for the preparation of some monoperacids such as monopersuccinic acid, the solubility of phthalic anhydride in highly concentrated hydrogen peroxide solutions has been too slight to permit satisfactory reaction to occur between the phthalic anhydride and the peroxide.

The new and improved process with which this invention is concerned permits for the first time the manufacture of concentrated solutions of monoperphthalic acid by reacting phthalic anhydride and solutions of hydrogen peroxide of the usual commercial concentration.

Accordingly, one of the objects of this invention is to develop a new and improved method for the manufacture of monoperphthalic acid, its salts, and solutions of both the acid and its salts, which method will involve the reaction of phthalic anhydride and hydrogen peroxide solutions of the normal commercial concentration. Another object of this invention is the development of a method for manufacturing monoperphthalic acid which can be readily carried out without the necessity for employing complicated or extensive chemical manipulation. Still another object of our invention is the development of a method which requires no cooling of the reaction mixture, a method in which the desired product is formed rapidly and the reaction proceeds readily to substantial completion despite the relative insolubility of phthalic anhydride. Among other objects of this invention may be specified the development of a process wherein the solid peracid is readily isolated from its solutions by simple cooling and drying. These and still further objects of our new and improved process for the manufacture of monoperphthalic acid and its salts will be apparent from the ensuing disclosure of certain preferred embodiments thereof.

Our process, in general, involves dissolving phthalic anhydride, $C_6H_4(CO)_2O$, in an aqueous solution of hydrogen peroxide with the aid of heat to yield a highly concentrated solution of the peracid. From this highly concentrated solution of the peracid less concentrated solution may be obtained readily by dilution, or the solid peracid may be obtained upon solidification and drying.

Our preferred method involves the utilization of the usual commercial aqueous solution of hydrogen peroxide of 100 volume concentration (27.6% $H_2O_2$ by weight) such as that sold under the trade-mark name "Albone." The volume concentration of a solution of hydrogen peroxide is defined as the number of volumes of oxygen gas measured at 0° C. and 760 mm. of mercury pressure which will be evolved upon complete decomposition of one volume of the solution measured at 20° C. Such solutions are acidic in reaction, having a pH of 4.5 or below. In carrying out the reaction of phthalic anhydride and the concentrated solution of hydrogen peroxide in accordance with our improved method, the pH of the reaction mixture is always 7.0 or below.

After addition of the phthalic anhydride to the solution of hydrogen peroxide the mixture is heated to 45° C. in order to start the reaction. The reaction mixture is preferably stirred by means of a slow-speed agitator. After thorough dispersion of the reactants the temperature rises to one within the range 60 to 65° C., ordinarily within fifteen minutes, as a result of the heat of reaction developed in the reaction mixture. At the end of this period the anhydride goes completely into solution. The product is a syrupy, slightly cloudy solution having an active oxygen concentration of approximately 50 volumes.

For the preparation of solutions of monoperphthalic acid or its salts, which solutions are of considerable utility for bleaching and for various oxidizing purposes, the resulting product may be diluted to the desired active oxygen concentration by the addition of cold water. If it should be desired to prepare the solid peracid, the hot, syrupy reaction mixture may be subjected, without external cooling, to vacuum drying under a pressure of 20 to 30 mm. of mercury absolute. The temperature drops through evaporation of the moisture contained in the mass to one usually within the range 30 to 35° C. It is maintained at this temperature until the monoperphthalic acid solidifies. The product is then preferably dried in a current of air at ordinary temperatures until a solid containing in the neighborhood of 10% moisture is secured. The resulting solid product will contain 6% or more by weight of active oxygen.

While the procedure just given is our preferred method of carrying out the preparation of monoperphthalic acid by reacting phthalic anhydride and concentrated solutions of hydrogen peroxide, various modified procedures may be adopted. For example, while we prefer to use equimolar amounts of hydrogen peroxide and phthalic anhydride, the process can be carried out by using other molecular ratios of the two reagents. The quantity of phthalic anhydride used per mole of hydrogen peroxide may be varied from a very small amount to a slight excess, i. e. 5 to 10% over the stoichiometric equimolar amount. When the quantity of anhydride is less than the equimolar amount free hydrogen peroxide will remain in the reaction mixture. For certain industrial purposes a solution of this type of product may be desirable. The use of more than a slight excess of phthalic anhydride over the equimolar amount, however, is not desirable, as under these circumstances it is difficult to bring about complete solution of the phthalic anhydride in the peroxide solution.

Our process is most effectively practiced when ordinary commercial solutions of hydrogen peroxide of 100 volume concentration (27.6% $H_2O_2$ by weight) are utilized. The use of a solution of hydrogen peroxide of lower concentration tends to increase the amount of by-products formed in the reaction, while the use of hydrogen peroxide solutions of volume concentration higher than 100 volume tends to result in incomplete conversion due to incomplete solution of anhydride. Moreover, when solutions of hydrogen peroxide of over 100 volume concentration are utilized there is a tendency for the reaction to be highly exothermic.

However, we have obtained very satisfactory reaction of the phthalic anhydride and hydrogen peroxide using solutions of hydrogen peroxide of 90 volume concentration (24.8% $H_2O_2$ by weight). Similarly, the reaction can be satisfactorily carried out with solutions of hydrogen peroxide up to 140 volume concentration (38.6% $H_2O_2$ by weight).

In actual practice the temperature conditions in the reaction mixture during the reaction between the phthalic anhydride and hydrogen peroxide may vary over wide limits, depending on the concentration of the reagents involved and the degree of thermal insulation of the equipment used for carrying out the reaction. The rate of reaction of the peroxide and anhydride is very slow and incomplete when the initial reaction temperature is below about 45° C. At ordinary room temperature we have found that the rate of reaction is so slow as to be ordinarily negligible. We have found that when the temperature of the reaction mixture is within the range 45 to 65° C. the reaction proceeds satisfactorily with good conversion of peroxide to peracid. With temperatures up to 73° C. satisfactory reaction of the peroxide and anhydride is obtained, and the reaction time under these conditions is relatively short, being on the order of four to five minutes. At temperatures above 73° C. lower percentage yields are secured, and if the temperature is too elevated the reaction may be so fast as to become uncontrollable. Ordinarily we prefer that the temperature of the reaction mixture shall fall within the range 45 to 73° C. Under these conditions, when reacting small lots, it is necessary to maintain the reaction temperature by means of external heating, but when reacting substantial quantities of the chemical compounds the heat of reaction developed will be found to be sufficient to sustain the reaction.

As previously stated, the reaction mixture after the addition of the phthalic anhydride to the solution of hydrogen peroxide should have a pH of 7.0 or below. We have found it essential, in order to secure satisfactory solution and reaction of the phthalic anhydride with the peroxide, to insure the maintenance of neutral or acid conditions in the reaction mixture.

In preparing solutions of monoperphthalic acid from the resulting syrupy reaction mixture of fairly high active oxygen concentration, various agents for modifying the properties of the solution may be incorporated. Thus, an alkali or an acid may be added in order to adjust the pH of the resulting diluted solutions. Wetting, penetrating, and detergent agents for imparting other desirable properties to the solution may be added. When it is desired to secure the solid peracid from the peracid mixture the procedure may be modified in various ways. Thus the reaction mixture may be allowed to stand for several hours at room temperature, during which period the monoperphthalic acid solidifies. Subsequently the solidified mass may be broken up and dried in air.

As examples of our improved process for the preparation of organic monoperacids, particularly monoperphthalic acid, the following may be given.

Example 1

30 grams of phthalic anhydride and 25 cc. of 100 volume hydrogen peroxide solution were reacted at a temperature of 60-65° C. The 100 volume hydrogen peroxide solution was a commercial solution of that concentration (27.6% $H_2O_2$ by weight) sold under the trade-mark name "Albone."

After completion of the reaction the reaction mixture was cooled to room temperature and allowed to stand overnight at a temperature of 5° C. Monoperphthalic acid solidified in the solution and was recovered therefrom.

Example 2

296 grams of phthalic anhydride and 237 cc. of a solution of hydrogen peroxide of 100 volume concentration were reacted at a temperature of 60° C. When the reaction was complete, after about twelve minutes, the solution was subjected to vacuum drying in order to recover the monoperphthalic acid. At the end of a vacuum drying period of twelve minutes, the pressure being about 25 mm. of mercury absolute and the temperature being approximately 35° C., there was secured a concentrated solution of monoperphthalic acid. The solid acid was precipitated from this solution by maintaining it at 4° C. for approximately one hour. The resulting product had an available active oxygen concentration of substantially 6.45%.

Example 3

By following the procedure described in Example 2 but continuing the period of vacuum drying for fifteen minutes, the monoperphthalic acid solidified at once in the reactor without the necessity for further cooling. During the drying period approximately 114 grams of water were removed and the resulting product contained less water than that prepared in Example 2. The active oxygen content of the monoperphthalic acid was 7.3%.

Example 4

7 pounds of 100 volume hydrogen peroxide solution were reacted with 8.4 pounds of phthalic anhydride. In order to initiate the reaction the temperature was raised to 74° C. During the course of the reaction the temperature varied from 49° C to 64° C. When the reaction was complete at the end of about seventeen minutes there was obtained a solution of monoperphthalic acid, 76.5% of the active oxygen present in the amount of hydrogen peroxide reacted having been converted to the peracid.

Example 5

14 pounds of 100 volume hydrogen peroxide solution were reacted at a temperature of 68-74° C. with 16.8 pounds of flaked phthalic anhydride. At the end of fifteen minutes the reaction was substantially complete. The recovery of monoperphthalic acid was 70.6%, based on the active oxygen content of the peroxide.

Example 6

123 grams of 100 volume hydrogen peroxide solution and 148 grams of phthalic anhydride were reacted at various reaction temperatures. When the reaction temperature was about 60° C. the reaction was substantially complete in fifteen minutes, the recovery of monoperphthalic acid, based on the active oxygen content of the peroxide, being substantially 90%. At 73° C. the reaction was complete in slightly over one minute, the yield of monoperphthalic acid being over 88%. At a reaction temperature of 80° C. the yield of monoperphthalic acid was somewhat lower (about 73%) owing to decomposition at the more elevated temperature. However, the reaction was more rapid and was substantially complete in one minute or slightly over one minute.

Example 7

6 pounds of 100 volume hydrogen peroxide solution were reacted with 7.2 pounds of phthalic anhydride at two separate reaction temperatures. In one case the reaction temperature varied from 49 to 65° C., the reaction having been started by preheating the reagents to 60° C. In the second case the reaction temperature was somewhat higher, 71 to 93° C., preheating to about 82° C. being employed to initiate the reaction.

At the lower reaction temperature the yield of monoperphthalic acid, based on the active oxygen recovered, was substantially 90%. At the higher reaction temperature monoperphthalic acid was also the product of the reaction, but the yield was somewhat lower. Moreover, at the higher temperature, the reaction was more violent and somewhat more rapid.

Example 8

13 grams of phthalic anhydride were reacted with 11.1 cc. of a solution of hydrogen peroxide of 90 volume concentration. The reaction temperature varied from 60 to 71° C., and approximatly twelve minutes were required for complete reaction. The yield of monoperphthalic acid, based on active oxygen recovered, was in excess of 80%.

It is thus apparent that in following our new and improved process for the manufacture of monoperphthalic acid it is not necessary to cool the reaction mixture. Moreover, the preparation of the monoperphthalic acid is simple and direct, and requires but a short time and the ordinary equipment found in any chemical laboratory or chemical factory. Moreover, highly concentrated solutions of peracid are formed, as contrasted with previous methods which resulted only in very dilute solutions. The solid monoperphthalic acid is readily secured by drying, specialized procedures for the separation of the monoperacid from its solution being unnecessary. The solutions of monoperphthalic acid resulting may be readily diluted to any desired concentration and utilized, either in the form of the acid itself or as any salt of the acid, for various oxidizing and bleaching purposes.

As various changes may be made in our process as described without departing from the spirit of our invention, its scope should not be restricted to precise details and conditions given as illustrative of preferred embodiments thereof, except as necessitated by the appended claims and prior art.

We claim:

1. A process for preparing monoperphthalic acid which comprises reacting phthalic anhydride and a solution of hydrogen peroxide having a concentration within the range 90–140 volumes, said reaction being carried out at a temperature not exceeding 73° C.

2. A process for preparing monoperphthalic acid which comprises reacting phthalic anhydride and a solution of hydrogen peroxide having a concentration within the range 90–140 volumes, said reaction being carried out at a temperature of 45–73° C.

3. A process for preparing monoperphthalic acid which comprises reacting phthalic anhydride and a solution of hydrogen peroxide having a concentration within the range 90–140 volumes, said reaction being carried out at a temperature not exceeding 73° C. and under conditions wherein the pH of the reaction mixture does not exceed 7.0.

4. A process for preparing monoperphthalic acid which comprises reacting phthalic anhydride and a solution of hydrogen peroxide having a concentration within the range 90–140 volumes, said reaction being carried out in a reaction mixture having a pH not in excess of 7.0.

5. A process for preparing monoperphthalic acid which comprises reacting phthalic anhydride and a solution of hydrogen peroxide having a concentration within the range 90–140 volumes, said reaction being carried out at a temperature within the range 45 to 73° C., and in an aqueous reaction mixture having a pH value not in excess of 7.0.

6. A process for preparing monoperphthalic acid which comprises reacting a concentrated solution of hydrogen peroxide and phthalic anhydride in an aqueous reaction mixture having a pH not in excess of 7.0, said reaction being carried out at a temperature not exceeding 73° C., and then cooling said reaction mixture in order to recover the monoperphthalic acid product in solid form.

7. A process for preparing monoperphthalic acid which comprises reacting phthalic anhydride and an aqueous solution of hydrogen peroxide having a concentration within the range 90 to 140 volumes, said reaction being carried out at a temperature of 45–73° C. and under conditions wherein the pH of the reaction mixture does not exceed 7.0, and evaporating said resulting reaction mixture in order to recover said monoperphthalic acid in solid form.

JOSEPH S. REICHERT.
ARTHUR A. ELSTON.